United States Patent
Yevick

[11] 3,853,395
[45] Dec. 10, 1974

[54] MICRO OPTIC STORAGE AND RETRIEVAL SYSTEM

[75] Inventor: George J. Yevick, Leonia, N.J.

[73] Assignee: Personal Communications, Inc., Stamford, Conn.

[22] Filed: Mar. 9, 1973

[21] Appl. No.: 339,905

[52] U.S. Cl. .................................. 353/27, 353/38
[51] Int. Cl. ...................... G03b 21/11, G03b 23/08
[58] Field of Search .......................... 353/25–27, 353/38, 127, 122

[56] References Cited
UNITED STATES PATENTS

| | | | |
|---|---|---|---|
| 1,874,193 | 8/1932 | Keen | 353/38 |
| 3,332,318 | 7/1967 | Gessel | 353/25 |
| 3,704,068 | 11/1972 | Waly | 353/27 |
| 3,712,724 | 1/1973 | Courtney-Pratt | 353/25 |

*Primary Examiner*—Harry N. Haroian
*Assistant Examiner*—A. J. Mirabito
*Attorney, Agent, or Firm*—Thomas J. Greer, Jr.

[57] ABSTRACT

A microfiche having one surface embossed or molded to define a multiplicity of closely spaced lensettes. The micro-image of a letter (of the alphabet) is located directly below each lensette, thereby assuring optical distance registry between each letter micro-image and a lens for its projection. The micro-image on the microfiche functions as an object, this object providing an image serving in turn as an object for a projection lens array.

6 Claims, 3 Drawing Figures

MICRO OPTIC STORAGE AND RETRIEVAL SYSTEM

This invention relates to a distributed optical information storage and retrieval system. It more particularly relates to an improvement in a novel method for positioning the intelligence on a microfiche with respect to lenses for projecting the intelligence on a viewing screen.

In certain prior constructions of micro-optic readers, a microfiche defined by an emulsion film carried on one surface of a clear plastic sheet is positioned next to a plastic plate having integral protuberances. The protuberances function as lenses (termed lensettes because of their small size) and are intended to be aligned with optical bits of information on the microfiche emulsion, thereby projecting and magnifying the bits. In such constructions it is of paramount importance that the distance between the emulsion and the lensettes remain constant during all readout movement of the microfiche and over all portions of its area. This is so because of the relatively small focal lengths of the lensettes. Thus, relatively small variations in the distance between the emulsion and lensettes cause large changes in the final, projected image of the intelligence. If, for example, the viewing screen and microfiche are 8 inches × 10 inches, then the distance between the emulsion and lensettes must not vary even as much as a mil over the 80 sq. inches area if satisfactory images of all the intelligence are realized.

According to the construction shown in my copending application Ser. No. 309,968, filed Nov. 28, 1972, this criticality is eliminated by embossing or molding the microfiche to thereby define lensettes on and integral with the fiche itself. Thus, the emulsion, the clear plastic sheet (e.g., methyl methacrylate) which carries the emulsion, and the lensettes all define a unitary structure. By this construction, movement of the microfiche relative to projecting light sources (in order to read out the information) cannot result in variations of the distance between the emulsion and the projecting lensettes. This distance now becomes a function only of the microfiche thickness, a quantity which may be accurately controlled during manufacture of the microfiche.

The present invention relates to a further improvement which yields higher magnifications and makes possible better optical corrections for reading out intelligence.

IN THE DRAWINGS

Figure 1:
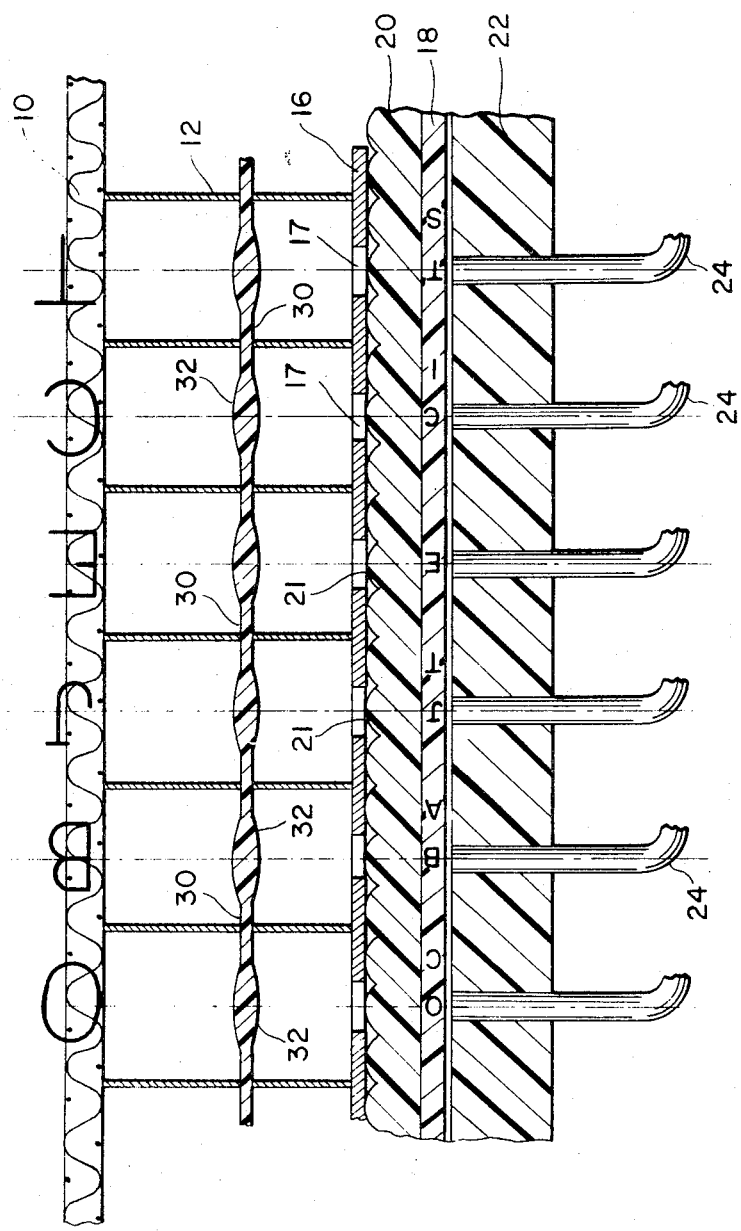
FIG. 1 is a partial cross-sectional view of a distributed optics microfiche reader provided with a set of projection lenses distinct from those carried by and integral with the microfiche (lensfiche).

Referring now to the drawings, FIG. 1 illustrates a construction partially shown in noted copending patent application and which is provided with a set of projection lenses distinct from those carried by the microfiche.

The numeral 10 denotes a viewing screen formed of, for example, a translucent material. Septa 12 are positioned as indicated and extend downwardly from the screen 10 to an opaque mask 16, the septa breaking up the entire surface of the screen 10 into smaller areas or cells. The purpose of the septa is to inhibit crosstalk, i.e., overlapping of projected information. The mask 16 is provided with spaced openings or apertures 17 which are in alignment with integral lenses (lensettes) 21 on transparent sheet 20. The numeral 18 denotes an emulsion, greatly exaggerated in thickness for purposes of illustration, carried by sheet 20 of, for example, a clear plastic such as methyl methacrylate. The element 20 with its emulsion 18 is termed a lensfiche. The numeral 22 denotes a spacing and supporting plate which carries a plurality of fiber optic light conducting pipes or tubes 24. The upper termini thereof are aligned with the optic axes of several lensettes 21. The light pipes 24 are fed in a conventional manner to a suitable source of illumination.

For purposes of illustration, micro images of the letters (bits) of the word OBJECT, in distributed or spaced form, are carried by the emulsion 18 underneath a first unique set of lensettes 21 and correspond to one page of a book, of text, etc. A second page contains words which might include CAT IS and is also carried by the emulsion 18 underneath a second unique set of lensettes 21.

In operation, the microfiche 20 is inserted between mask 16 and plate 20 and the source of illumination (not illustrated) energized. Light passes from the light pipes 24 through the emulsion 18 which carries the intelligence and through the transparent body of the microfiche. The several letters of the intelligence OBJECT are thus projected through the apertures 17 of the mask 16, having also passed through lensettes 21. In order to view the next page, the microfiche is indexed to the left, thereby aligning the letters (bits) of CAT IS with the same openings 17.

The lens elements 21 are formed by embossing or molding the top surface of microfiche 20, the entire microfiche exhibiting over its entire top surface a multiplicity of lens elements 21, such as in the manner of a street paved with cobblestones. The distance between the apertures 17 is 100 mils in the example given, and there are hence twenty five lensettes between them, instead of the three shown.

Those parts of the apparatus illustrated as FIG. 1 which have been described above are known from my noted copending application. For the practice of this invention, a second set of projection lenses, distinct from the set carried by the microfiche, is provided. These lenses are denoted by the numeral 32 at FIG. 1 and are integrally molded on plate 30. The plate 30 may be formed of a clear plastic, such as methyl methacrylate, having an index of refraction of approximately 1.5. The plate 30 is positioned as indicated between screen 10 and mask 16. If desired, the septa 12 may be attached to the plate 30. The projected intelligence has been schematically indicated at FIG. 1 and it will be observed that no inversion of the intelligence appears relative to that in the emulsion 18 because two projection lenses 21 and 32 are employed.

Figure 2:
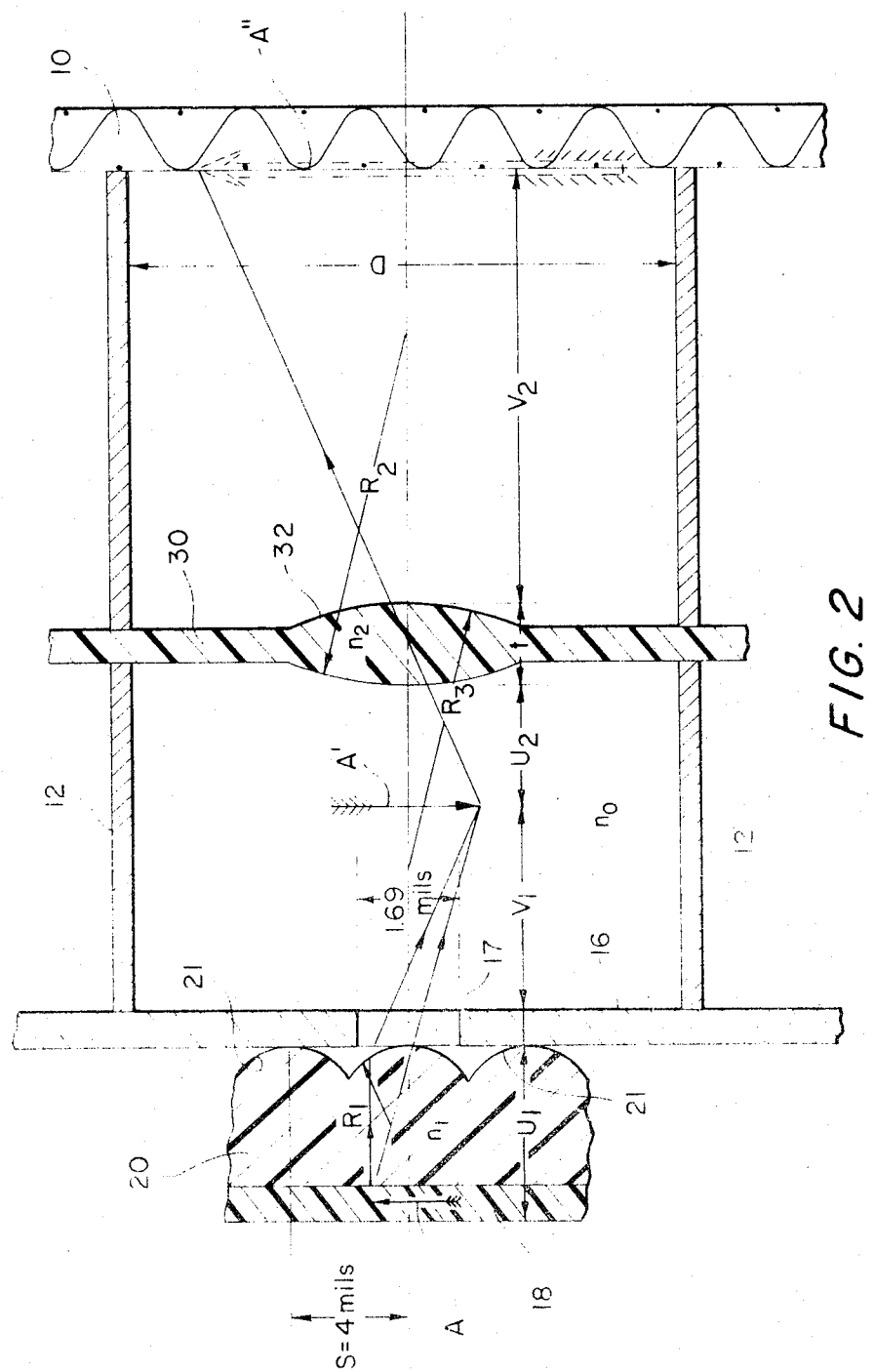
FIG. 2 is an enlarged view of one of the cells illustrated in FIG. 1.

Referring now to FIG. 2 of the drawings, the optical principles of the present invention are illustrated. The magnification of object A in emulsion 18 is given by $m_1 = -n_1 v_1 / n_0 u_1$ where $u_1$ is the object distance in the fiche 20.

$n_1$ is the index of refraction in the fiche.

$v_1$ is the image distance of the projection of object A by integral lensettes 21.

$n_0$ is the index of refraction in the image space, where image A' is formed.

$m_1$ is the magnification produced by the lensette 21.

$R_1$ is the radius of curvature of the refracting lensette 21.

Several of these quantities are related by the following well-known formula:

$$(n_1/u_1) + (n_o/v_1) = (n_o - n_1/R_1)$$

The image A' which is formed between lensette 21 and lens 32 is real and serves as an object for the projection lens 32. The effect of projection lens 32 is to further magnify the object A' by a magnifying factor $m_2$. Inasmuch as the precision or criticality requirement of the subject system is basically solved or made possible by the integral lensfiche 20, greater latitude or tolerance for misalignment is possible with regard to the projection lens plate 30 and its lenses 32. The overall magnification of the system according to this invention now becomes $M = m_1 \times m_2$.

The role of the projection lens plate 30 and associated lenses may be best explained by consideration of the following relations:

The simple lens formula yields $$1/u_2 + 1/v_2 = 1/f_2 = (n_2 - n_o)(1/R_3 - 1/R_2)$$

for the case of $t$, the thickness of lens 32, being effectively zero and where $u_2$ is the distance from the image of lensette 21 to the first surface of the projection lens 32. $v_2$ is the distance from the second surface of lens 32 to the screen 10. $n_2$ is the index of refraction of lens 32. $n_o$ is the index of refraction of the space outside lens 32 (assumed the same on both sides for sake of simplicity).

$R_2$ is the radius of curvature of the first surface of lens 32.

$R_3$ is the radius of curvature of the second surface of lens 32.

$f_2$ is the focal length of lensette 21 (assumed to be a thin lens). The magnification of the projection lens 32 is given by $$m_2 = -v_2/u_2$$

For all practical purposes $$|v_2| = (m_2 + 1)|f_2|$$

or $$m_2 = (v_2/f_2) - 1$$

Hence, the overall magnification $|M| = |m_1| |m_2| = n_1/n_o \times |v_1/u_1| |v_2/u_2|$ Likewise, for lens 21, let $f_1$, its focal length, be defined as follows;

$$n_o/f_1 = (n_o - n_1/R_1)$$

Hence, $$m_1 = (v_1/f_1) - 1$$

or $$M = m_1 \times m_2 = (v_1/f_1 - 1)(v_2/f_2 - 1) \approx v_1 \times v_2/f_1 \times f_2$$

An example of large $M$ is $M = 150$ which for the purposes of microfiche reading is presently regarded as an ultrafiche and is now the limit in the practical state of the art as embodied in National Cash Register Company's PCMI system. The PCMI system magnifies 125 times with a projection lens having at least ten elements. Furthermore, the PCMI system is relatively large. The present system employs only small angle paraxial rays and hence there need be only two elements in a simple molded lens system. Furthermore, the present system at a magnification of 150 can be made very compact, less than an inch thick with a screen size of 8½ inches × 11 inches.

As a specific example a standard 7 mil photographic film is taken and embossed with lensettes 21 of $R_1 = 2.25$ mils on 4 mil centers. This now defines lensfiche 20.

Since $u_1 = 7$ mils, $n_1 = 1.5$, $v_1 = 117$ mils

Then $m_1 = 25$

The size of the intelligence in emulsion 18 is D/M in size, where D is the near linear dimension of the (hexagonal or square) micro-optical cells which contain the micro images. Likewise, the size of the image of lensette 21 which serves as the object for the projection lenslet is $D/m_2$.

Hence, as a typical example for an $f$-number, $f^*$, of 4 which is the optimum $f$-number, $$f^* = \text{focal length}/d \text{ optimum} = 4$$

or $d_{opt} = 1.69$ mils = aperture 17 diameter

Hence, at $M_1 = 25$, the first image is 100 mils high. Upon magnification $M_2$ of 7, I obtain an overall $D = 7 \times 100 = 700$ mils or around 0.7 inch.

The thickness of a microfiche reader such as shown in FIG. 1 depends primarily on $v_1 + v_2$, and the following obtains:

$$v_1 = 117 \text{ mils}$$

$v_2$ must be calculated from the focal length $f_2$ of projection lens 32.

This depends upon how small a focal length may be tolerated, in particular, how paraxial the rays.

As an example, consider $f_2 = 100$ mils, hence $v_2 \approx 8 \times 100 \approx 800$ mils Hence $u_2 = 800/7 = 133$ mils Therefore, the overall thickness of the system from lensfiche 20 to screen 10 is $v_1 + u_2 + v_2 = 117 + 113 + 800 = 1{,}050$ mils $\approx 1$ inch Because of the relatively large size of the projection lens 32, there is no difficulty in correcting for various aberrations using aspherical surfaces. This is made possible by a fixed object distance $u_2$.

Figure 3:
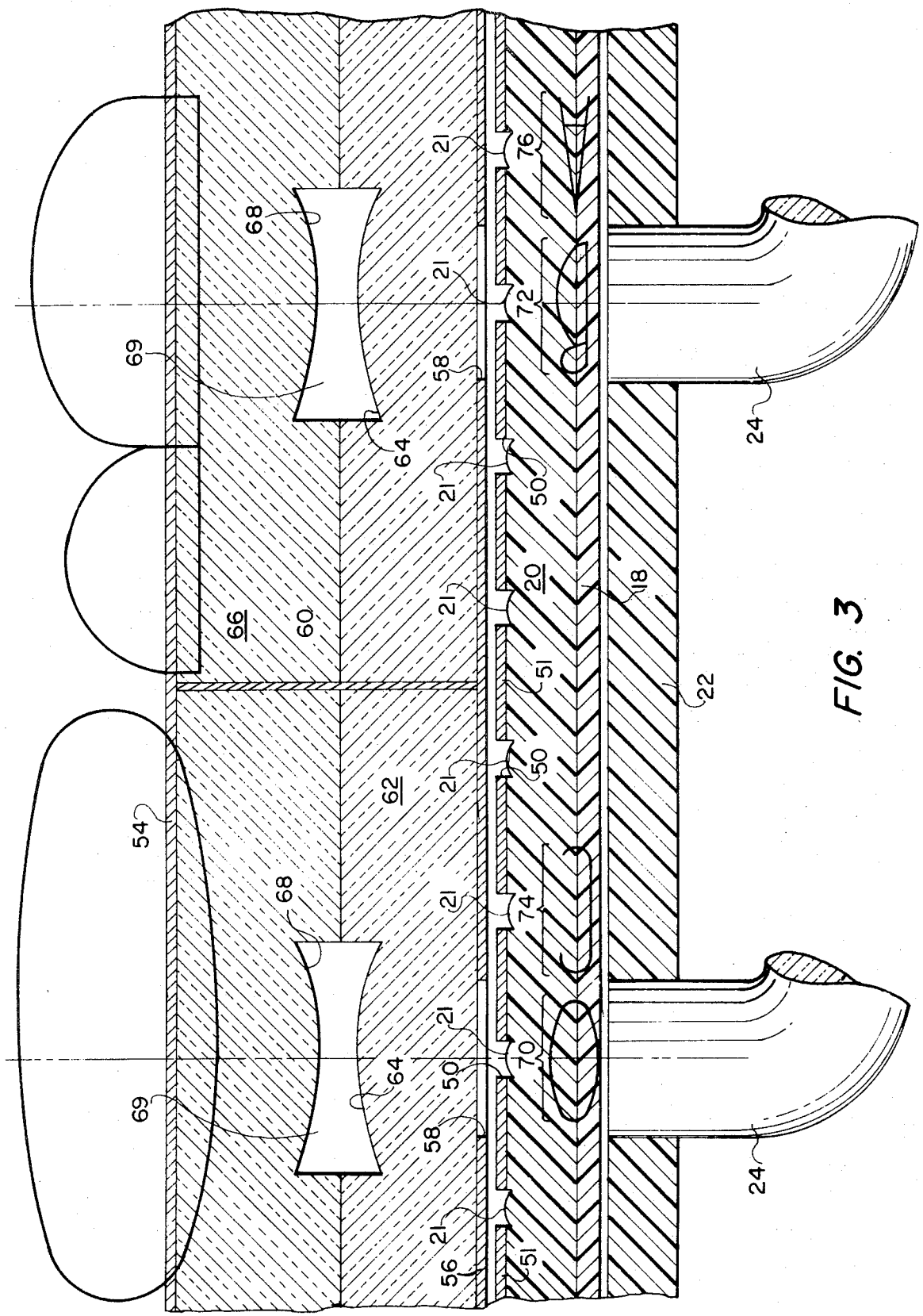
FIG. 3 is a view similar to FIG. 1, and illustrates another embodiment.

Referring now to FIG. 3 of the drawings, another embodiment of the present invention is illustrated. In this embodiment the lensfiche is provided with and carries an opaque mask over its top (upper) interlensette surface. The lenses 32 of the embodiment of FIG. 1 are replaced with corresponding recesses in transparent plates. The uppermost surface of these plates defines the viewing screen. The numerals 18, 20, 21 denote the same elements as previously described. The lensettes 21 are spaced from each other along the plane of the lensfiche and are depressed, lying each in a depression or cavity 50. The remaining areas of the top of the lensfiche, i.e., the interlensette area, are provided with an opaque coating denoted by the numeral 51. The numeral 62 denotes a lower transparent plate, for example of methyl methacrylate, and provided at its upper surface with spaced recesses 64. An upper transparent plate, of the same material, is denoted by the numeral 66 and is provided at its lower surface with spaced recesses 68. The recesses of the two plates are in juxtaposition and define a space or cavity 69 having the shape of a concave-concave lens. The cavities function as convex-convex lenses, since they are surrounded by material (methyl methacrylate) having a greater index of refraction (>1) than they possess (=1). The top surface of plate 66 may be coated with a light-diffusing film 54 adapted to serve as a viewing screen. The bottom surface of block 62 is coated with an opaque substance 56, except for apertures 58, and may additionally be coated with an anti-friction material such as Teflon. Light pipes 24 carried by plate 22 illuminate the micro images carried by emulsion 18 for projection on viewing screen 54.

In operation, the lensfiche is moved (indexed) by sliding, and successive groups of lensettes 21 are exposed to those termini of light pipes 24 which are aligned with openings 58. The micro images carried by the emulsion are optically projected upwardly lensettes 21, plates 62 and 68 and the lens cavities 69, and appear in magnified form on screen 54. If desired, septa such as 60 may be molded into the plates 62 and 66 to inhibit overlapping of images on the viewing screen. Two letters of a recorded information set in emulsion 18 commencing with OBJECT are schematically illustrated. The micro image of the letter "0" is shown (necessarily out of scale due to drawing size limitations) on emulsion 18 and appears on screen 54 greatly magnified. Similarly, the micro image of the next letter "B" appears on screen 54. The cells in emulsion 18 which contain these two micro images are denoted, respectively, by the areas underneath vincula 70 and 72.

In order to project the next information set on screen 54, the lensfiche is moved to the left. For this second information set, commencing for example with CAT IS, the first two letters "C" and "A" are illustrated as occupying adjacent areas in emulsion 18 underneath vincula 74 and 76, respectively. Magnified images of the letters "C" and "A" will now appear on screen 54 in the same places illustrated for letters "O" "B." The micro images of letters "O" and "B" now are positioned beneath opaque surface 56, laterally of opening 58, and are hence not projected on the screen.

The reader will recognize that an analysis of the embodiment of FIG. 3 is entirely similar to that given with respect to FIG. 2. The mask 16 and apertures 17 correspond to coating 56 and apertures 58 of FIG. 3. The space between the mask 16 and viewing screen 10 is now filled with the two transparent plates 62 and 66, with lenses 32 replaced by cavities 69.

I claim:

1. A microfiche and reader for projecting and viewing micro optic information carried by a microfiche having a plurality of lensettes, the reader including a viewing surface against which information is adapted to be projected, the microfiche carrying a plurality of images each defined by a set of sub-images spaced over the microfiche, the sub-images being each adapted to be projected over the multiplicity of parallel, spaced optical axes to the viewing surface, and an apertured mask positioned between the microfiche and the viewing surface, the improvement which comprises:
   a. an intermediate projection lens positioned between each mask aperture and said viewing surface and having its optic axis coincident with the normal axis of each said mask aperture,
   b. each mask aperture being aligned with one of said lensettes, the number of lensettes being greater than both the number of projection lenses and mask apertures,
   c. a plurality of vertical, opaque septa extending from adjacent said surface to adjacent said apertured mask, said septa dividing the space between said surface and said apertured mask into a plurality of cells, there being one such cell for each of said apertures in the mask.

2. The microfiche and reader of claim 2 wherein each said intermediate lens is carried by a sheet, said sheet positioned parallel to said viewing surface.

3. The microfiche and reader of claim 2 wherein said sheet and said intermediate lens are integral.

4. The microfiche and reader of claim 3 wherein all of said intermediate lenses are integral with a single sheet.

5. A microfiche and reader for projecting and viewing micro optic information carried by a microfiche having a plurality of lensettes, the reader including a viewing surface against which information is adapted to be projected, the microfiche carrying a plurality of images each defined by a set of sub-images spaced over the microfiche, the sub-images being each adapted to be projected over a multiplicity of parallel, spaced optical axes to the viewing surface, and an apertured mask positioned between the microfiche and the viewing surface, the improvement which comprises;
   a. an intermediate projection lens positioned between each mask aperture and said viewing surface and having its optic axis coincident with the normal axis of each said mask aperture,
   b. each mask aperture being aligned with one of said lensettes, the number of lensettes being greater than both the number of projection lenses and mask apertures,
   c. a pair of transparent plates interposed between said apertured mask and said viewing surface, mating surfaces of said plates having cavities therein which define lens cavities optically aligned with a corresponding one of the apertures in said mask, said lens cavities defining said intermediate projection lenses, the upper surfaces of the uppermost plate defining said viewing surface.

6. A microfiche and reader for projecting and viewing micro optic information carried by a microfiche having a plurality of lensettes, the reader including a viewing surface against which information is adapted to be projected, the microfiche carrying a plurality of images each defined by a set of sub-images spaced over the microfiche, the sub-images being each adapted to be projected over a multiplicity of parallel, spaced optical axes to the viewing surface, and an apertured mask positioned between the microfiche and the viewing surface, the improvement which comprises:
   a. an intermediate projection lens positioned between each mask aperture and said viewing surface and having its optic axis coincident with the normal axis of each said mask aperture,
   b. each mask aperture being aligned with one of said lensettes, the number of lensettes being greater than both the number of projection lenses and mask apertures,
   c. the interlensette area on the microfiche being opaque on the same surface of the microfiche as the lensettes.

* * * * *